United States Patent
Griffioen

(10) Patent No.: US 11,710,949 B2
(45) Date of Patent: Jul. 25, 2023

(54) INSTALLATION OF CABLES IN AN ARRAY OF DUCTS

(71) Applicant: Plumettaz Holding S.A., Bex (CH)

(72) Inventor: Willem Griffioen, Ter Aar (CH)

(73) Assignee: Plumettaz Holding S.A., Bex (CH)

( * ) Notice: Subject to any disclaimer, the term of this patent is extended or adjusted under 35 U.S.C. 154(b) by 303 days.

(21) Appl. No.: 17/290,189

(22) PCT Filed: Nov. 12, 2019

(86) PCT No.: PCT/EP2019/081044
§ 371 (c)(1),
(2) Date: Apr. 29, 2021

(87) PCT Pub. No.: WO2020/099417
PCT Pub. Date: May 22, 2020

(65) Prior Publication Data
US 2022/0045490 A1 Feb. 10, 2022

(30) Foreign Application Priority Data
Nov. 13, 2018 (CH) ..................... 01397/18

(51) Int. Cl.
*H02G 1/08* (2006.01)
*F16L 55/38* (2006.01)
*H02G 1/10* (2006.01)

(52) U.S. Cl.
CPC .............. *H02G 1/086* (2013.01); *F16L 55/38* (2013.01); *H02G 1/10* (2013.01)

(58) Field of Classification Search
CPC ............ H02G 1/10; H02G 1/086; H02G 9/04; H02G 9/06; H02G 9/08; G02B 6/4464; F16L 55/38
See application file for complete search history.

(56) References Cited

U.S. PATENT DOCUMENTS 6,047,954 A * 4/2000 Griffioen ................ H02G 1/086
254/134.3 R
2014/0190574 A1 7/2014 Parsinejad et al.

FOREIGN PATENT DOCUMENTS

EP 2606543 A2 6/2013
WO 200146735 A2 6/2001
(Continued)

OTHER PUBLICATIONS

Foreign Communication from a Related Counterpart Application, International Search Report and Written Opinion dated Jan. 28, 2020, International Application No. PCT/EP2019/081044 filed on Nov. 12, 2019.

(Continued)

*Primary Examiner* — Tyrone V Hall, Jr.

(57) ABSTRACT

Method for installing a cable comprising:
a first phase with at least the steps of:
introducing the cable into a first duct,
attaching at least a first pig to the cable,
introducing a liquid at first pressure and first flow into the first duct,
stopping the cable when, or after, its foremost end has reached an exit of the first duct,
a second phase with at least the steps of:
attaching at least a second pig to the cable,
introducing again a liquid at first pressure and first flow into the first duct,
introducing the liquid at second pressure and second flow,
compensating, at a location between the first duct and second duct, for a difference in flow or volume of liquid.

15 Claims, 3 Drawing Sheets

(56) References Cited

FOREIGN PATENT DOCUMENTS

| WO | WO-0146735 A2 * | 6/2001 | ........... G02B 6/4464 |
|----|----|----|----|
| WO | 2011054551 A2 | 5/2011 | |
| WO | 2012022799 A2 | 2/2012 | |
| WO | 2020099417 A1 | 5/2020 | |

OTHER PUBLICATIONS

Foreign Communication from a Related Counterpart Application, Swiss Search Report dated Feb. 4, 2019, Swiss Application No. 01397/18 filed on Nov. 13, 2018.
Willem Griffioen, et al. "New Technique to Install Power Cables Into Ducts", 8th International Conference on Insulated Power Cables, Oct. 9, 2014, pp. 1-6, XP055659753, Retrieved From the Internet: URL: https://www.researchgate.net/profile/Willem_Griffioen/publication/266675181_new_technique_to_install_power_cables_into_ducts/links/5436fbae0cf2bf1f2d44c1/new-technique-to-install-power-cables-into-ducts.pdf (retrieved on Jan. 20, 2020).

\* cited by examiner

INSTALLATION OF CABLES IN AN ARRAY OF DUCTS

CROSS-REFERENCE TO RELATED APPLICATIONS

The present application is a filing under 35 U.S.C. 371 as the National Stage of International Application No. PCT/EP2019/081044, filed Nov. 12, 2019, entitled "INSTALLATION OF CABLES IN AN ARRAY OF DUCTS," which claims priority to Swiss Application No. 01397/18 filed with the Intellectual Property Office of Switzerland on Nov. 13, 2018, both of which are incorporated herein by reference in their entirety for all purposes.

The present invention relates to the laying of cables into ducts, and in particular the invention relates to cases where power cables are to be installed in an array of ducts, for example already buried or laid onto seabed between windmills installed offshore.

Document U.S. Pat. No. 6,047,954A describes the laying of a cable into ducts arranged in series, with help of a fluid which is air. This document discloses the laying into ducts having different and increased diameters. However, the disclosed process in this document, with air, is not helpful to lay power cables for example, on long distances.

The present invention aims to address the above mentioned drawbacks of the prior art, and to propose first a method of laying a cable into a series of ducts, with a simple process, well suited to lay power cable into long ducts, and even in an array of ducts.

In this aim, a first aspect of the invention relates to a method for installing a cable in a duct network comprising a remote duct, the method comprising:
 a first phase with at least the steps of:
 introducing the cable into a first duct having a first size such as a first diameter,
 introducing at least a first pig into the first duct, said at least first pig being arranged to couple with the cable,
 introducing a liquid at first pressure and first flow into the first duct, for transporting the cable equipped with the first pig through the first duct,
 stopping the cable when, or after, its foremost end has reached an exit of the first duct,
 a second phase with at least the steps of:
 attaching at least a second pig to the cable and introducing the second pig into a second duct, being the remote duct, and having a second size such as a second diameter, different from the first size,
 introducing again a liquid at first pressure and first flow into the first duct,
 introducing the liquid at second pressure and second flow into the second duct, for transporting the cable equipped with the second pig through the second duct,
 compensating, until the first pig reaches the exit of the first duct, at a location between the first duct and second duct, for a difference in flow or volume of liquid, wherein the difference in flow or volume is caused by the first pig travelling in first duct with same speed as the second pig travelling in second duct, while the first pig is still in the first duct.

The method according to the above embodiment comprises the laying of a cable through a first duct to a second duct (first and second ducts having different sizes), and while one rear portion of the cable is still into the first duct with a first pig, one front portion of the cable is in the second duct with a second pig. According to the method, there is a compensation of flow or volume of liquid, in between the two ducts, to have efficient and smooth laying of the cable. Then, the power cable can be laid into the second duct from a remote location (which is entry of first duct) even if the ducts have different sizes (typically, different diameters).

Typically, first phase is performed with several first pigs attached to the cable, these first pigs being gradually removed and replaced by second pigs as far as the cable is introduced and moves into the second duct. It has to be noted that the removal of the first pigs is not mandatory, if their size is compliant with the second duct.

In an embodiment, the first pig is introduced once the cable is fully inserted in first duct, and enters in contact with cable, with the liquid pushing the first pig and then the cable. In other embodiments, the first pig might be attached to the cable, with clamping jaws for example. In any case, the first pig couples with the cable to push the latter through the first duct.

The first phase comprises a step of stopping the cable. This might be done once the foremost end of the cable has already entered the second and remote duct. Cable has then entered the second duct by for example at least one meter, and the second pig can be easily attached and guided into the second duct when the cable is moved again.

Advantageously, second phase comprises a step of varying the second pressure until the second pressure reaches a predetermined value where a cable speed is reached. The method encompass an adjustment of the pressure "behind the second pig", i.e. the pressure of liquid supplied into the second duct from its entry, so as to optimize the speed of the cable. In other words, the cable speed is monitored and the second pressure is adjusted to maximize the speed. The cable speed can be measured with a laser speedometer, or with an assessment of the flow of liquid in first and/or second duct.

Advantageously, there is a step of exchanging data between the location at entry of the first duct, and the location at exit of first duct/entry of the second duct. Such exchange of data can be done via radio wave, internet network, phone network, as the locations might be separated by 10 km or more. Typically, data related to measures of pressure/flow/cable speed are exchanged.

Advantageously, the method comprises a step of measuring or assessing a flow of liquid coming out of the first duct, to assess the cable speed, so as to provide a feed back loop for the second pressure adjustment, in order to optimize the cable speed. An automated control of pressure/flow between the two ducts can then be provided, taking into account the cable speed. The flow is typically measured with a flowmeter.

In particular, the method comprises a step of measuring or assessing the compensated volume or flow of liquid at the location between the first duct and second duct, to assess the cable speed, so as to provide a feed back loop for the second pressure adjustment, in order to optimize the cable speed. An automated control can then be provided. The flow is typically measured with a flowmeter.

Advantageously, the first duct presents a greater size than the second duct, and the compensation for a volume of liquid at the location between the first duct and second duct is a draining of an excess of liquid coming out of the first duct.

Advantageously, the first duct presents a smaller size than the second duct, and the compensation for a volume of liquid at the location between the first duct and second duct is a supplying of liquid into the second duct.

Advantageously, at least one part of, and preferably all, the liquid supplied into the second duct comes from the first duct. In such embodiment, the reuse of liquid leads to savings of liquid, and this simplifies the overall process/machine, as only the difference of flow or volume is required to be drained or supplied.

Advantageously, the installation comprises:
a main platform with a main pumping unit;
a remote platform with a remote pressure and flow adjustment unit, for example a bleeding unit and/or a pumping unit;
a plurality of final units, such as wind mills;
a plurality of first ducts installed in parallel between the main platform and the remote platform;
a plurality of second ducts each installed between the remote platform and one of the final units;
and at least one first or second phase for transporting a cable in one of the first ducts or one of the second ducts is carried out simultaneously with one other first or second phase for transporting another cable in one other of the first ducts or in one other of the second ducts. Having several parallel first ducts allows to minimize the installation time, as at least two cables might be laid in parallel or simultaneously. Also in addition to the flexibility, having several parallel first ducts lowers the risks of shutdown, as if one first duct is not available, another one can still be used.

Advantageously, the first ducts present different sizes, in particular different inner diameters, and/or the second ducts present different sizes, in particular different inner diameters.

Advantageously, one of the first ducts and/or one of the second ducts is used to send back a cable from a remote location to the entry of a first duct.

Advantageously, second phase comprises a step of pushing the cable into the second duct with a pushing unit (such as caterpillars), through a pressure chamber. The cable is immediately reinserted into the second duct from the first duct.

Advantageously, the method comprises a step of coiling at least partially the cable onto a reel, after it exits the first duct and before it enters the second duct.

Advantageously, the second transportation phase comprises a step of adjusting the first pressure, and/or the second pressure, so as to ensure that (equation 1) or (equation 2):

$$(p_m - p_2) \equiv (1 + \varepsilon)(p_1 - p_m) \text{ or} \tag{1}$$

$$F_2 = (1 + \varepsilon)\frac{D_2^2}{D_1^2}F_1, \tag{2}$$

with:
$F_1$ being a force applied by the liquid to the first pig;
$F_2$ being a force applied by the liquid to the second pig;
$D_1$ being the diameter of first duct (m),
$D_2$ being the diameter of second duct (m);
$p_1$ being the first pressure, at the rear side of first pig (Pa),
$p_m$ being the second pressure of liquid applied between first and second ducts (Pa),
$p_2$ being the third pressure, at the front side of the second pig level (Pa), and with:
$-0.60 \leq \varepsilon \leq +1.42$; and preferably $-0.48 \leq \varepsilon \leq +0.87$ In addition, it is also proposed to follow the below (equation 1.1):

$$\xi = \ln(1 + \varepsilon) = \ln\left(\frac{p_m - p_2}{p_1 - p_m}\right) \tag{1.1}$$

with:
$p_1$ being the first pressure, at the rear side of first pig (Pa),
$p_m$ being the second pressure of liquid applied between first and second ducts (Pa),
$p_2$ being the third pressure, at the front side of the second pig level (Pa).
and with second pressure $p_m$ set so that:
$-0.9 \leq \xi \leq +0.9$; and preferably $-0.6 \leq \xi \leq +0.6$ From equation (1), it follows (equation 3):

$$p_m = \frac{(1+\varepsilon)p_1 + p_2}{2+\varepsilon} \text{ or} \tag{3}$$

$$p_m - p_a = \frac{(1+\varepsilon)(p_1 - p_a) + (p_2 - p_a)}{2+\varepsilon}$$

with:
$p_1$ being the first pressure, at the rear side of first pig (Pa),
$p_m$ being the second pressure of liquid applied between first and second ducts (Pa),
$p_2$ being the third pressure, at the front side of the second pig level (Pa)
$p_a$ being the third pressure, at the exit of second duct (Pa).

When the cable speed v (m/s) is taken into account, the viscous losses in the first and second ducts can be taken into account. Typically, the cable length is smaller than the lengths of the first and/or second ducts, so that the viscous losses along the cable might be neglected, and the viscous losses in the first and second duct can be taken into account with the below equation 4:

$$\frac{p_0 - p_1}{L_1} = 0.16\frac{\mu^{1/4}\rho^{3/4}}{D_1^{5/4}}v^{7/4} \text{ (duct 1)} \tag{4}$$

$$\frac{p_2 - p_a}{L_2} = 0.16\frac{\mu^{1/4}\rho^{3/4}}{D_2^{5/4}}v^{7/4} \text{ (duct 2)}$$

with:
$D_1$ being the diameter of first duct (m),
$L_1$ being the length of first duct (m),
$D_2$ being the diameter of second duct (m),
$L_2$ being the length of second duct (m),
$p_0$ being the first pressure at entry of first duct (Pa),
$p_1$ being the first pressure, at the rear side of first pig (Pa),
$p_2$ being the third pressure at the front side of the second pig level (Pa),
$p_a$ being the third pressure at exit of second duct, typically atmospheric pressure (Pa),
$\mu$ being the dynamic viscosity of the liquid (Pa·s),
$\rho$ being the density of the liquid (kg/m³),
v being the speed of the cable (m/s).

In particular, the cable length is less than one half of the length of first and/or second ducts, preferably less than one fourth of the length of first and/or second ducts, more preferably less than one tenth of the length of first and/or second ducts. The above equations are valid when:
there is only one first pig coupled or attached to rear end of cable and no other first pig attached to the cable between the rear end of cable and exit of first duct, and only one second pig attached to foremost end of cable and no other second pig attached to the cable between entry of second duct and foremost end of second duct.

If "intermediate" first or second pigs are attached to the cable, these pigs will create "intermediate" pressure drops along the cable length.

Advantageously, the cable is equipped with only one first pig and only one second pig, and the second pressure $p_m$ is adjusted following the below (equation 5):

$$p_m - p_a = \frac{(1+\varepsilon)(p_0 - p_a) + 0.16\mu^{1/4}\rho^{3/4}v^{7/4}\left[-(1+\varepsilon)\frac{L_1}{D_1^{5/4}} + \frac{L_2}{D_2^{5/4}}\right]}{2+\varepsilon} \quad (5)$$

with:
$D_1$ being the diameter of first duct (m),
$L_1$ being the length of first duct (m),
$D_2$ being the diameter of second duct (m),
$L_2$ being the length of second duct (m),
$p_0$ being the first pressure at entry of first duct (Pa),
$p_a$ being the third pressure, set at atmospheric pressure (Pa),
μ being the dynamic viscosity of the liquid (Pa·s),
ρ being the density of the liquid (kg/m³),
v being the speed of the cable (m/s).

According to the above embodiment, the second (or intermediate) pressure is adjusted in relation to the geometry of cable and ducts, and also the cable speed, so as to reach optimized travel conditions.

In addition, and still in case there is only one first pig and only one second pig attached to the cable, the method comprises a step of measuring a minimum pressure in first duct necessary to initiate a movement of the cable in the ducts at optimal second pressure $p_m$ according to equation (3), and the method comprises a step of calculating (equation 6) a maximum speed that the cable might reach, so as to compare with a measure of a cable speed, with the below (equation 6):

$$v = \left[\frac{p_0 - p_{0s}}{0.16\mu^{1/4}\rho^{3/4}\left(\frac{L_1}{D_1^{5/4}} + \frac{L_2}{D_2^{5/4}}\right)}\right]^{4/7} \quad (6)$$

with:
$D_1$ being the diameter of first duct (m),
$L_1$ being the length of first duct (m),
$D_2$ being the diameter of second duct (m),
$L_2$ being the length of second duct (m),
$p_0$ being the first pressure at entry of first duct (Pa),
$p_{0s}$ being the first pressure at entry of first duct (Pa) necessary to initiate a movement of the cable in the ducts (measured at zero speed at optimal second pressure $p_m$ according to equation (3)),
μ being the dynamic viscosity of the liquid (Pa·s),
ρ being the density of the liquid (kg/m³),
v being the maximum reachable speed of the cable (m/s).

Advantageously, the maximum speed is compared to the measurement of cable speed, and if there is a difference of more than 10%, and preferably more than 20%, the method comprises a step of sending a warning message to an operator, and/or a step of adjusting the second pressure.

Advantageously, the first pig and/or the second pig is a leaking pig, the method comprises a preliminary step of adjusting a pressure drop and or a leaking flow for the liquid leaking through the first pig and/or the second pig once installed into the first duct and/or the second duct, respectively. This step provides the capacity to set up the system with adequate working conditions of the pigs (leaking, pressure drop . . . ) to reach optimized conditions in terms of travel speed (up to several decades of meters per minute), with avoidance of buckling, capstan effect, even for a travel distance of more than 10 km.

Advantageously, the cable presents a length smaller than a length of the first duct, preferably less than half of the length of the first duct, preferably less than one fourth of the length of first duct, more preferably less than one tenth of the length of first duct. Typically, during first phase, there is a step during which cable is propelled through first duct solely with the liquid acting onto the cable and first pigs, as length of cable is smaller than the first duct. Such step is known as "free floating". Typically, at least one (first) pig is attached to the foremost end of the cable, and one (first) pig is coupled (pushed into contact or clamped) to the rear end of the cable. These two pigs might not have the same structure, but are considered as "first pigs" in the present disclosure.

Advantageously, the liquid is water, or sea water or, or high salinity water, or water with additives (alcohol, lubricant, oil . . . ) to improve processing.

Other features and advantages of the present invention will appear more clearly from the following detailed description of particular non-limitative examples of the invention, illustrated by the appended drawings where:

In the present application, it is referred to cable, which may be for example, elongated element, electric cables, preferably power cables, but might also designate optical fibres or cables, temperature sensing optic fibres or cables. All these elongated elements may comprise for example a core, a coating, or a sheath. However, the wording elongated element is not limited to any of these specific examples.

It is also referred to ducts, which may be for example pipes, hollow cylinders, tubes, conduits: anything defining a channel in which an elongated element may be laid in or out, from a first location to a second location. In any case, a duct in the present application designates a conduit having a length far greater than its diameter (at least 5000 times, and preferably at least 10000 times and in practice 50000 times).

In the present disclosure, "first pressure" designates a pressure of liquid into first duct, typically between the entry of first duct and the rear end of the cable. Due to viscous losses, such first pressure might not be constant along the first duct. "Second pressure" designates a pressure of liquid into first or second duct, between first pig and second pig, typically between first pig and exit of first duct and between entry of second duct and second pig (attached to foremost end of a cable travelling into second duct). Due to viscous losses as well, such second pressure might not be constant along the cable, but due to short length of the cable compared to length of ducts, said viscous losses might be neglected. "Third pressure" designates a pressure of liquid into second duct, typically between foremost end of a cable travelling into second duct and exit of second duct (where such third pressure is typically atmospheric pressure). Due to viscous losses as well, such third pressure might not be constant along the second duct.

In particular, the first pressure at the entry of the first duct is designated with $p_0$, and the first pressure in the vicinity of the first pig is designated with $p_1$ (in other words $p_1$ is the liquid pressure in the few meters near the first pig, between entry of first duct and the first pig at rear side of the cable). The third pressure in the viscidity of the second pig is designated with $p_2$ (in other words $p_2$ is the liquid pressure in the few meters near the second pig, between the second pig attached to foremost end of cable and exit of the second duct), and third pressure at the exit of the second duct is designated with $p_a$, being usually atmospheric pressure.

In the present application Freefloating represents a technique of laying a cable into a duct with the cable being shorter than the duct. In a Freefloating technique, the cable is equipped with pigs, and a liquid is introduced into the duct, to generate "self propelling" forces onto the pigs when the cable is fully inserted into the duct. Document WO2012022799 (A2) gives an example of use of Freefloating technique.

Figure 1:
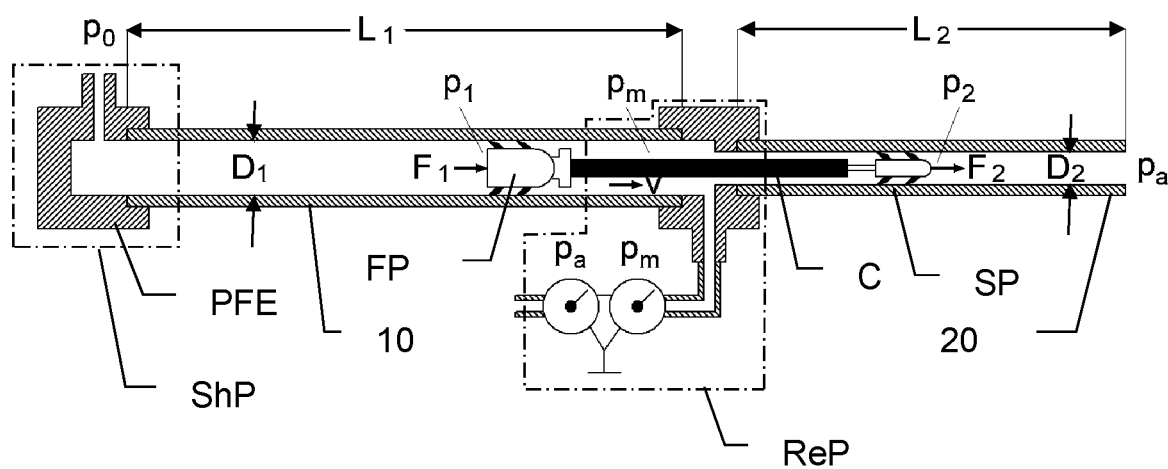
FIG. 1 represents a schematic view of a duct network where a cable is installed into a first duct and a second duct with the method according to the invention.

FIG. 1 represents a simplified duct network with a first duct 10 (with internal diameter $D_1$ and length $L_1$) and a second duct 20 (with internal diameter $D_2$ and length $L_2$) into which a cable C is introduced. Typically, entry of first duct 10 is located on shore, at a shore platform ShP, first duct 10 might have a length of several kilometers. Exit of first duct 10 and entry of second duct 20 are located at a remote platform ReP, which might be located off-shore.

On FIG. 1, the cable C is shown already located in the last part of first duct 10 and partly installed into second duct 20. The cable C is propelled through the ducts 10 and 20 with a FreeFloating technique. In this aim, the cable C is equipped with pigs, as described for example in document WO2011054551 (A2). In the first duct 10, a first pig FP is shown attached to the rear end of the cable C, and in the second duct 20, a second pig SP is shown attached to the foremost end of cable C. However, other first pigs might be attached to the cable C along its portion located in first duct 10, and other second pigs SP might be attached to the cable C along its portion located in the second duct 20.

The propelling of the cable C is achieved with injection under pressure of a liquid in entry of first duct 10, at the shore platform ShP, at a first pressure Po, and also liquid is introduced into second duct 20 at its entry of the second duct 20 at the remote platform ReP.

During the full installation, a first phase comprises the laying and propelling of the cable C through the first duct 10: at the shore platform ShP, the cable C is typically unreeled, to be introduced (with caterpillars) into the first duct 10 with a pushing and floating equipment PFE, as described in documents WO2011054551 (A2) and WO2012022799 (A2). The cable C is typically equipped with several first pigs FP, to be propelled into the first duct 10, and the liquid is also introduced under pressure to "push" the cable C, as shown in FIG. 1: a force $F_1$ is generated by the first pig FP, with the pressure $p_1$ applied to rear side of first pig FP ($p_1$ being different from first pressure $p_0$ when cable C travels, as viscous losses occur along the first duct 10).

Once the cable C is about to arrive, or has arrived at the remote platform ReP, the propelling in first duct 10 is stopped, to allow (optional) removal of a front pig typically installed at the foremost end of the cable, and installation of a second pig SP, dedicated to the second duct 20, as the second duct 20 presents a different size compared to the first duct 10 (and the first pig FP has not an adequate size to be used in the second duct 20).

A second phase then is initiated, with attachment of second pig SP, and liquid is introduced again under pressure into the first duct 10. In addition, the method also comprises a step of introducing liquid also into the second duct 20, at a second pressure $P_m$, so as to generate a propelling force $F_2$ with the second pig SP with a compensation of the difference of volume of flow or volume of liquid between the first duct 10 and second duct 20.

In case the second duct 20 has smaller size (diameter) than first duct 10 (most frequent case), only a pressure regulator and bleeding valve is necessary. In case the second duct 20 has greater size (diameter) than first duct 10, a pumping unit is also necessary, in addition to said pressure regulator and bleeding valve.

Of course, the second phase might comprise several stops to gradually remove the first pigs FP attached along cable C when they reach exit of first duct, to be replaced by second pigs SP.

The direct introduction of the cable C into the second duct makes unnecessary the transportation and storage of one or more reel(s) to the remote platform ReP, which might be offshore, thus facilitating a lot the laying of the cable C into the network of ducts (in particular no boat transportation of heavy reels to the remote platform ReP is required).

In addition, the method advantageously comprises a step of measurement of the speed v of travel of the cable C, and the second pressure $P_m$ is then adjusted in relation to the cable speed (equation 5):

$$p_m - p_a = \frac{(1+\varepsilon)(p_0 - p_a) + 0.16\mu^{1/4}\rho^{3/4}v^{7/4}\left[-(1+\varepsilon)\frac{L_1}{D_1^{5/4}} + \frac{L_2}{D_2^{5/4}}\right]}{2+\varepsilon}$$

with:
$D_1$ being the diameter of first duct (m),
$L_1$ being the length of first duct (m),
$D_2$ being the diameter of second duct (m),
$L_2$ being the length of second duct (m),
$p_0$ being the first pressure (Pa) at entry of first duct,
$p_a$ being the third pressure at exit of second duct, preferably atmospheric pressure (Pa),
μ being the dynamic viscosity of the liquid (Pa·s),
ρ being the density of the liquid (kg/m³)
v being the speed of the cable (m/s).

In the above equation 5, the parameter ε is defined as follows:

$$(p_m - p_2) = (1+\varepsilon)(p_1 - p_m) \quad (1)$$

with:
−0.60≤ε≤+1.42; and preferably −0.48≤ε≤+0.87.

This ensures that the pressure $p_m$ is set at an optimum value, to avoid extra losses of pressure at the first pig and second pig.

Figure 3:
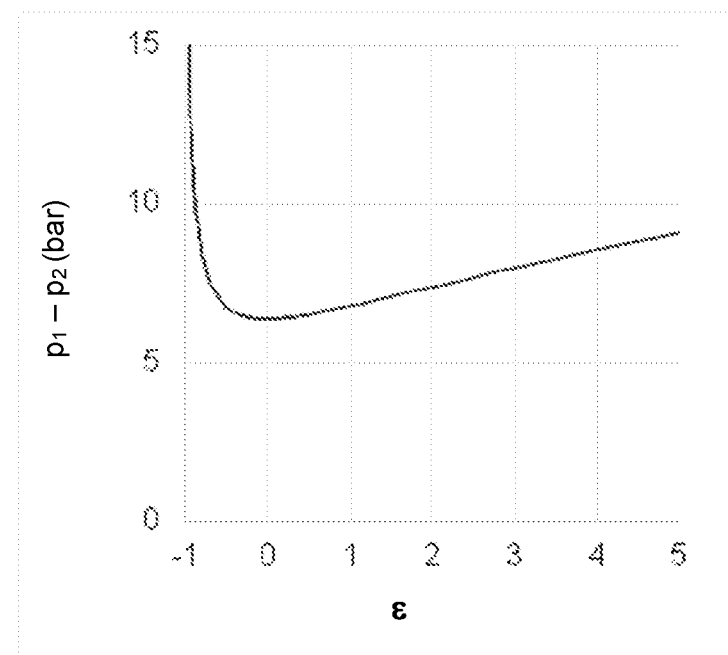
FIG. 3 represents the sum of the pressure difference over pigs coupled to the cable of FIG. 1, plotted as a function of a first parameter of the method according to the present invention.
Figure 4:
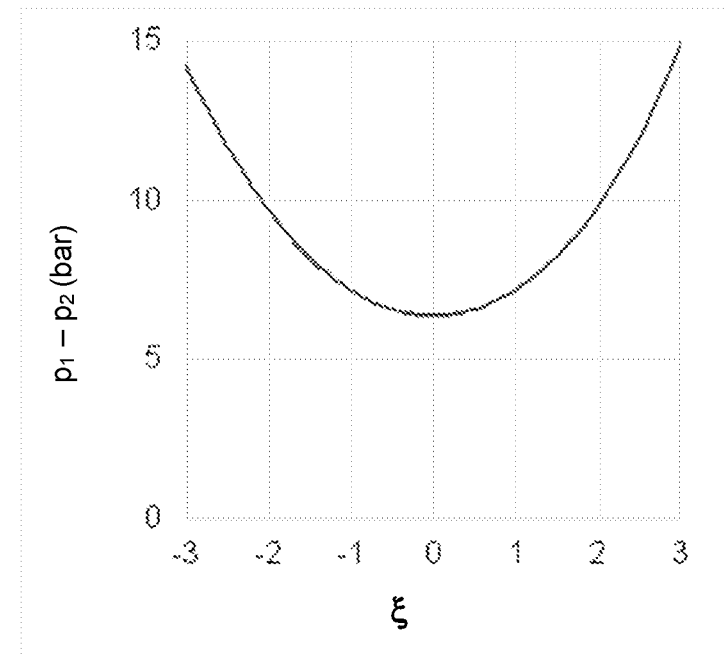
FIG. 4 represents the sum of the pressure difference over pigs coupled to the cable of FIG. 1, plotted as a function of a second parameter of the method according to the present invention

In particular, FIG. 3 represents the sum of the pressure difference over first and second pigs coupled to the cable of FIG. 1, plotted as a function of this first parameter ε. It is shown on this FIG. 3 that there is a minimum global loss of pressure over first and second pigs for ε=−0.02. This means that the rest of pressure is available to force a maximum fluid speed (limited by viscosity) through the ducts, propelling the cable with about that speed, for this specific value of this first parameter ε (thus the cable travels at an optimum and maximum speed). One should notice that in such case, the drops of pressure are almost balanced between first and second pig, meaning that the forces applied by the first and second pig are not equal (due to the difference of size of the ducts). As above indicated, preferred ranges for setting this first parameter ε are:

$-0.60 \leq \varepsilon \leq +1.42$; and preferably $-0.48 \leq \varepsilon \leq +0.87$ Still related to this case, FIG. 4 represents the sum of the pressure difference over pigs coupled to the cable of FIG. 1, plotted as a function of a second parameter defined in equation 1.1 as:

$$\xi = \ln(1+\varepsilon) = \ln\left(\frac{p_m - p_2}{p_1 - p_m}\right) \quad (1.1)$$

with second pressure $p_m$ set so that:
$-0.9 \leq \xi \leq +0.9$; and preferably $-0.6 \leq \varepsilon \leq +0.6$ Same remark as above: there is a minimum global loss of pressure over first and second pigs, here for $\xi=-0.02$. This means that the rest of pressure is available to force a maximum fluid speed (limited by viscosity) through the ducts, propelling the cable with about that speed, for this specific value (thus at an optimum and maximum speed). One should notice that in such case, the drops of pressure are almost balanced between first and second pig, meaning that the forces applied by the first and second pig are not equal (due to the difference of size of the ducts).

As above indicated, preferred ranges for setting this second parameter $\xi$ are:
$-0.9 \leq \xi \leq +0.9$; and preferably $-0.6 \leq \xi \leq +0.6$ The speed might be measured by several ways: a speed sensor might be installed between first duct 10 and second duct 20 to make direct measurement on the cable C in this area where it is visible. Alternatively, it is also possible to measure a flow of liquid (injected into the first duct 10, and/or injected in second duct 20, and/or drained out of first duct 10) to assess the speed of cable C.

It is also possible to assess the maximum speed the cable can reach, after an initial step of measuring a minimum pressure in first duct necessary to initiate a movement of the cable in the ducts, the maximum speed can be calculated as follows (equation 6):

$$v = \left[\frac{p_0 - p_{0s}}{0.16\mu^{1/4}\rho^{3/4}\left(\frac{L_1}{D_1^{5/4}} + \frac{L_2}{D_2^{5/4}}\right)}\right]^{4/7}$$

with:
$D_1$ being the diameter of first duct (m),
$D_2$ being the diameter of second duct (m),
$L_1$ being the length of first duct (m),
$L_2$ being the length of second duct (m),
$p_0$ being the first pressure at entry of first duct (Pa),
$p_{0s}$ being the first pressure at entry of first duct (Pa) necessary to initiate a movement of the cable in the ducts (measured at zero speed),
μ being the dynamic viscosity of the liquid (Pa·s),
ρ being the density of the liquid (kg/m$^3$).

Figure 2:
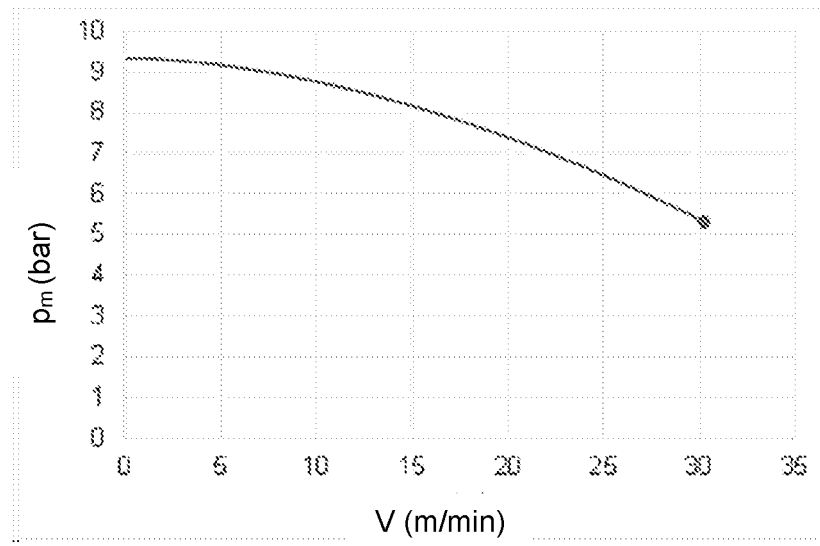
FIG. 2 represents a graph showing how the speed of a cable during its installation into an array of ducts according to an embodiment depends on a liquid pressure applied between first duct and second duct, and adjusted according to the present invention.

In FIG. 2, the maximum cable speed is calculated, for a first numeric example. Offshore wind park with first duct 10 having length $L_1$ of 40 km and internal diameter $D_1$ of 130 mm, is connecting a shore platform ShP to a remote platform ReP where a second duct 20 is installed, having total length $L_2$ of 5 km and internal diameter $D_2$ of 90 mm. Consider first the limit of zero cable speed, and that a first pressure $p_{0s}$ of 6.4 bar at entry of first duct necessary to initiate a movement of the cable positioned in the first and second ducts (measured at zero speed at optimal second pressure $p_m$ according to equation (3)) is sufficient to move the cable.

In the balance between $F_1$ and $F_2$ an example of an optimum with a value ε of 0.4 is chosen. With equation (1) values of $F_1$ and $F_2$ of 3544 N and 2373 N are found, respectively, and according to equation (3) a second pressure $p_m$ value of 3.73 bar. As the cable C is still static, it follows that $p_1=p_0$ and $p_2=p_a$. From equation (3), a pressure $p_m$ at the connection of 9.33 bar is found when the pressure $p_1=p_0=16$ bar (note that a larger pressure difference is present over the pigs than needed to move the cable, the excess effectively accelerating the cable, while the pressure second pressure $p_m$ may be continuously adjusted according to equation (5) to maximize the acceleration and ending at the optimum max speed). The same value is found with equation (5) for a cable speed v equal to zero.

The latter formula is also valid for cable speeds larger than zero and $p_1$ and $p_2$ affected by viscous losses. For an applied water pressure $p_0$ of 16 bar (representing an example of the maximum pressure the ducts can withstand), a maximum speed $v_{max}$ of 30.3 m/min is found with equation (6). The pressure $p_m$ at the connection as a function of cable speed v then follows with equation (5), see FIG. 2. Note that the pressure $p_m$ drops considerably, from 9.33 bar at zero cable speed to 5.32 bar at max cable speed.

Several scenarios can be encompassed. With communication means (telephone, internet, radio waves . . . ) between the shore platform and the remote platform, it can be chosen to adjust the second pressure $p_m$ at the remote platform (automatically, with no operator at the remote platform), having values of a given first pressure at first duct entry $p_0$ (measured at the shore platform), so as to optimize cable speed. It can be also decided to adjust the first pressure in first duct $p_0$ and/or second pressure $p_m$, so as to set specific rear pushing force, and/or specific front pulling force onto the cable, so as to avoid buckling or capstan effect.

It is also possible to measure the cable speed with the flow of liquid, and to use this value in a feed back loop for adjusting the second pressure to reach the maximum speed, and/or to compare the current measured speed with the (calculated) maximum speed and send warning messages/or run additional steps of pressure adjustment, if a difference between the current measured speed and the (calculated) maximum speed is greater than a threshold (10%, 20%, . . . ).

Figure 5:
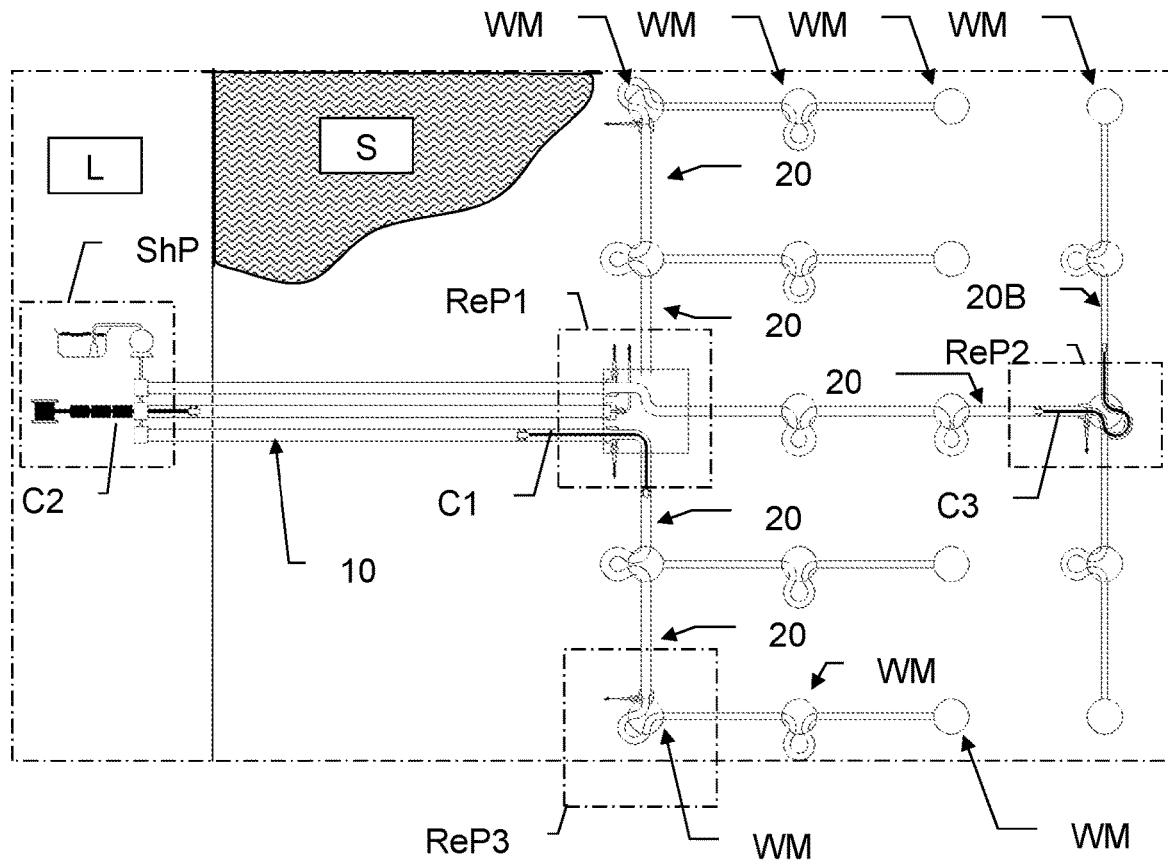
FIG. 5 represents another example of a duct network and installation of cables.

FIG. 5 shows an example of duct network in a wind farm. Twenty windmills WM are shown on sea S, connected to a shore platform ShP at land L via second ducts 20, remote platforms ReP1, ReP2, ReP3 . . . and first ducts 10.

FIG. 5 shows several first ducts 10 installed in parallel between the shore platform ShP and the first remote platform ReP1, to give more flexibility (several cables C can be installed between the shore platform ShP and the first remote platform ReP1), to improve safety (even if one first duct 10 is blocked, others will be still available), and also several sizes of first ducts 10 might be installed, to be able to propose the most adequate laying process even if the cables C to install are different.

In an embodiment, it is possible to install three phases cables in first ducts, but in other embodiments, single phase cables might be installed in dedicated ducts, the latter being available until the respective single phase cable being installed. Also, a fourth duct can be also present, as a spare duct.

It is also possible to send back cables C from the first remote platform ReP1 to the shore platform ShP.

The shore platform ShP, and the remote platforms ReP1, ReP2, ReP3 . . . are equipped with pumping units (at least one water pump for example), with advantageously flow meters, speed meters, pressure sensors, pressure regulators, flow regulators, so as to be capable of injecting in each of the ducts a specified flow of liquid, at a specified pressure. The remote platforms ReP1, ReP2, ReP3 . . . are optionally equipped with the pumping units, as in most frequent cases ($D_1 > D_2$), only a pressure regulator and bleeding valve is necessary to drain out liquid. However, in some cases with still $D_2 < D_1$ it might be advantageous to have a remote pump to reduce viscous losses and increase speed. In such case, a pushing unit and pressure chamber might be needed.

In the FIG. 5, a first cable C1 is currently located at the first remote platform ReP1, ending its travel through a first duct 10, and already travelling through a second duct 20. In this case, some liquid is drained out of the first duct 10 at the first remote platform ReP1, while some of this liquid is directly reinjected into the second duct 20 at second pressure $p_m$. This reinjected liquid is drained out of second duct 20 where first cable C1 is travelling, at the third remote platform ReP3.

Simultaneously, a second cable C2 is unreeled at the shore platform ShP, and is at the beginning of travelling through a first duct 10, distinct form the first duct 10 where first cable C1 is still travelling. All the liquid coming out of this first duct 10 is drained at first remote platform ReP1.

Still simultaneously, a third cable C3 is travelling through the remote ducts (second ducts 20), and is currently located at the second remote platform ReP2, and some liquid is drained out, while the third cable C3 is installed into a second duct 20B having a smaller size than the second duct 20.

Figure 6:
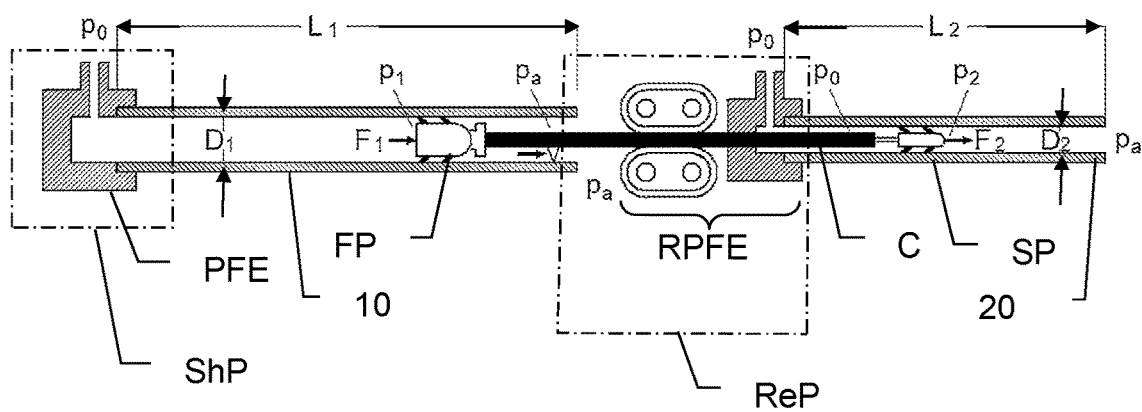
FIG. 6 represents an alternative equipment to lay a cable in the duct network of FIG. 1.

FIG. 6 represents an alternative way of installing a cable in the duct network of FIG. 1. In this case, it is chosen to have at the remote platform ReP a remote pushing and floating equipment RPFE, with caterpillars and a pressure chamber, to inject liquid in the second duct 20 with a given pressure. The cable C is then directly pushed into the second duct 20, as soon as it exits the first duct 10. As an option, it might be encompassed to coil or partially coil the cable C, after exit from first duct 10 and before its introduction into the second duct 20.

With use of the remote pushing and floating equipment RPFE, it is advantageous to collect (at least some of) the liquid drained out of first duct 10, to reinject this liquid into the second duct 20.

In summary, with the method of the invention, cables can be installed in submarine ducts from land, without the need to go offshore. As offshore activity costs far more than land activity, and also the working window for offshore is only about 100 days (365 for land activity), a lot of costs and time can be saved. And, of course, also transporting all those cable drums to different far away (offshore) locations is also not needed, offering again a cost saving.

It is of course understood that obvious improvements and/or modifications for one skilled in the art may be implemented, still being under the scope of the invention as it is defined by the appended claims.

In particular, in the frame of present invention where the network has several first ducts and several second ducts, it is possible to encompass to use liquid drained out of one duct to reinject this liquid into several second ducts at same time, with at least one of this second ducts sharing a cable coming out of said first duct. The other second ducts where the liquid is reinjected might receive a cable which is fully inserted, but propelled to a further location, downstream in the duct network.

The invention claimed is:

1. Method for installing a cable in a duct network comprising a remote duct, the method comprising:
   a first phase with at least the steps of:
      introducing the cable into a first duct having a first size such as a first diameter,
      introducing at least one first pig into the first duct, said first pig being arranged to couple with the cable,
      introducing a liquid at first pressure and first flow into the first duct, for transporting the cable equipped with the first pig through the first duct,
      stopping the cable when, or after, its foremost end has reached an exit of the first duct,
   a second phase with at least the steps of:
      attaching at least a second pig to the cable and introducing the second pig into a second duct, being the remote duct, and having a second size such as a second diameter, different from the first size,
      introducing again a liquid at first pressure and first flow into the first duct,
      introducing the liquid at second pressure and second flow into the second duct, for transporting the cable equipped with the second pig through the second duct,
      compensating, until the first pig reaches the exit of the first duct, at a location between the first duct and second duct, for a difference in flow or volume of liquid, wherein the difference in flow or volume is caused by the first pig travelling in first duct with same speed as the second pig travelling in second duct, while the first pig is still in the first duct.

2. Method according to claim 1, wherein second phase comprises a step of varying the second pressure until the second pressure reaches a predetermined value where a cable speed is reached.

3. Method according to claim 2, comprising a step of measuring or assessing a flow of liquid coming out of the first duct, to assess the cable speed, so as to provide a feed back loop for the second pressure adjustment.

4. Method according to claim 2, comprising a step of measuring or assessing the compensated volume or flow of liquid at the location between the first duct and second duct, to assess the cable speed, so as to provide a feed back loop for the second pressure adjustment.

5. Method according to claim 1, wherein the first duct presents a greater size than the second duct, and wherein the compensation for a volume of liquid at the location between the first duct and second duct is a draining of an excess of liquid coming out of the first duct.

6. Method according to claim 1, wherein the first duct presents a smaller size than the second duct, and wherein the compensation for a volume of liquid at the location between the first duct and second duct is a supplying of liquid into the second duct.

7. Method according to claim 1, wherein at least one part of, and preferably all, the liquid supplied into the second duct comes from the first duct.

8. Method according to claim 1, wherein the installation comprises:
   a main platform with a main pumping unit;
   a remote platform with a remote pressure and flow adjustment unit;

a plurality of final units, such as wind mills;
a plurality of first ducts installed in parallel between the main platform and the remote platform;
a plurality of second ducts each installed between the remote platform and one of the final units;
wherein at least one first or second phase for transporting a cable in one of the first ducts or one of the second ducts is carried out simultaneously with one other first or second phase for transporting another cable in one other of the first ducts or in one other of the second ducts.

9. Method according to claim 8, wherein the first ducts present different sizes, in particular different inner diameters, and/or the second ducts present different sizes, in particular different inner diameters.

10. Method according to claim 1, wherein the second transportation phase comprises a step of adjusting the first pressure applied to a rear side of the first pig, and/or the second pressure applied to a rear side of the second pig, so as to ensure that:

$$(p_m - p_2) \equiv (1 + \varepsilon)(p_1 - p_m) \text{ or} \quad (1)$$

$$F_2 = (1 + \varepsilon)\frac{D_2^2}{D_1^2}F_1, \quad (2)$$

with:
$F_1$ being a force applied by the liquid to the first pig;
$F_2$ being a force applied by the liquid to the second pig;
$D_1$ being the diameter of first duct (m),
$D_2$ being the diameter of second duct (m);
$p_1$ being the first pressure, at the rear side of first pig (Pa),
$p_m$ being the second pressure of liquid applied between first and second ducts (Pa),
$p_2$ being the third pressure, at the front side of the second pig level (Pa) and with:
$-0.60 \leq \varepsilon \leq +1.42$; and preferably $-0.48 \leq \varepsilon \leq +0.87$.

11. Method according to claim 10, wherein the cable is equipped with only one first pig and only one second pig, and the second pressure $p_m$ is adjusted following the below formula:

$$p_m - p_a = \frac{(1 + \varepsilon)(p_0 - p_a) + 0.16\mu^{1/4}\rho^{3/4}v^{7/4}\left[-(1 + \varepsilon)\frac{L_1}{D_1^{5/4}} + \frac{L_2}{D_2^{5/4}}\right]}{2 + \varepsilon} \quad (5)$$

with:
$D_1$ being the diameter of first duct (m),
$L_1$ being the length of first duct (m),
$D_2$ being the diameter of second duct (m),
$L_2$ being the length of second duct (m),
$p_o$ being the first pressure (Pa) at entry of first duct,
$p_a$ being the third pressure at exit of second duct, preferably atmospheric pressure (Pa),
$\mu$ being the dynamic viscosity of the liquid (Pa·s),
$\rho$ being the density of the liquid (kg/m³),
$v$ being the speed of the cable (m/s).

12. Method according to claim 1, wherein the first pig and/or the second pig is a leaking pig, the method comprising a preliminary step of adjusting a pressure drop and or a leaking flow for the liquid leaking through the first pig and/or the second pig once installed into the first duct and/or the second duct, respectively.

13. Method according to claim 1, wherein second phase comprises a step of pushing the cable into the second duct with a pushing unit, through a pressure chamber.

14. Method according to claim 1, comprising a step of coiling at least partially the cable onto a reel, after it exits the first duct and before it enters the second duct.

15. Method according to claim 1, wherein the cable presents a length smaller than a length of the first duct, preferably less than half of the length of the first duct.

* * * * *